United States Patent
Kennedy

(10) Patent No.: US 9,360,133 B2
(45) Date of Patent: Jun. 7, 2016

(54) CUSHIONED CHECK VALVE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 134 days.

(21) Appl. No.: 14/513,727

(22) Filed: Oct. 14, 2014

(65) Prior Publication Data
US 2016/0102780 A1 Apr. 14, 2016

(51) Int. Cl.
  F16K 15/00 (2006.01)
  F16K 47/02 (2006.01)
  F16K 15/03 (2006.01)
  F16K 31/122 (2006.01)

(52) U.S. Cl.
  CPC ............... F16K 47/023 (2013.01); F16K 15/03 (2013.01); F16K 31/122 (2013.01); *Y10T 137/7849* (2015.04)

(58) Field of Classification Search
  CPC ..... F16K 47/023; F16K 15/03; F16K 31/122; Y10T 137/7847; Y10T 137/7849; Y10T 137/7781
  See application file for complete search history.

(56) References Cited

U.S. PATENT DOCUMENTS

| | | | | |
|---|---|---|---|---|
| 1,464,614 | A * | 8/1923 | Nacey | A62C 35/645 137/420 |
| 4,437,460 | A * | 3/1984 | Glynn | A62B 9/025 128/204.26 |
| 5,186,198 | A | 2/1993 | Kennedy | |
| 5,746,246 | A * | 5/1998 | Yokota | F16K 15/033 137/514 |
| 6,102,072 | A * | 8/2000 | Yokota | F16K 15/03 137/512.3 |
| 8,028,715 | B2 * | 10/2011 | Shimizu | E03F 1/006 137/465 |
| 2007/0102047 | A1 * | 5/2007 | Graham | G05D 16/0663 137/494 |

OTHER PUBLICATIONS

"Val-Matic Surge Buster Check Valves" Brochure, Val-Matic Valve & Mfg. Corp., 2013.

* cited by examiner

*Primary Examiner* — Jessica Cahill
(74) *Attorney, Agent, or Firm* — Brown & Michaels, PC

(57) ABSTRACT

A cushioned check valve includes a flow channel with an inlet, a check valve, and an outlet. Bypass channels connect the outlet, a cylinder containing a piston, and the inlet. The piston is biased toward a first end of the cylinder by a diaphragm and a hermetically sealed gas volume containing a compressible gas, blocking the bypass channels. When the fluid pressure in the outlet exceeds a nominal operating range, the piston moves toward a second end of the cylinder until the fluid pressure acting on the piston is equalized by the piston bias, and fluid flows through the bypass channel. Once the fluid pressure and piston bias are equalized, the piston returns to a position blocking the bypass channels.

9 Claims, 7 Drawing Sheets

CUSHIONED CHECK VALVE

BACKGROUND OF THE INVENTION

1. Field of the Invention

The invention pertains to the field of fluid check valves. More particularly, the invention pertains to cushioned check valves.

2. Description of Related Art

Water hammer, also known as hydraulic shock, can occur in piping systems that carry a high momentum fluid when rapid changes in momentum of the fluid take place, for example, when a valve in the system is abruptly closed and the fluid stops flowing. As flowing fluids generally have a constant density and mass, changes in fluid momentum result from, for example, changes in fluid flow velocity, a cessation of fluid flow, or a reversal of flow direction causing retrograde flow. When a valve in the system is closed and fluid flow within the system suddenly stops, the change in fluid flow velocity causes a shockwave to form and propagate through the fluid and piping structures that carry the fluid. The shockwave may be characterized, physically and mathematically, as a transient high pressure pulse moving through the fluid flow system.

When the shockwave impacts valve gates and other solid structures, the energy carried by the high pressure of the shockwave is transferred to these solid structures. The shockwave pressure impacting piping and valve structures is undesirable, as it is a source of unwanted acoustic noise, vibration, and extreme pressure gradients that may cause significant mechanical stress on pipes, valves, and other fixtures. In extreme cases, pipes may burst from excessive pressure extremes associated with a shockwave, or conversely may implode at a location as a result of shockwave formation at another location.

In some systems, for example lift stations bringing a fluid such as water or sewage from one elevation to a higher elevation, check valves are often used to prevent or retard retrograde fluid flow when pumping systems are turned off or valves are closed. Changes in pump status when a pump is turned off, and closing of the check valve in these systems, may cause significant hydraulic shock, particularly when large diameter pipes and large differences in elevation are involved.

In the prior art, various solutions to mitigate hydraulic shock have been employed. In some solutions, the fundamental mitigation approach has been to either provide an alternative energy absorbing pathway for fluids to flow in, so that shockwave energy is dissipated when hydraulic shock occurs. In other approaches, the rate at which changes in flow velocity occur is regulated in order to prevent the formation of shockwaves at their source, or minimize the energy and extreme pressure increases associated with shockwaves.

Water towers, or vertical water column shunts, commonly provide alternative energy absorbing pathways. Fluids being pumped from a lower elevation to a higher elevation tend to reverse direction and produce retrograde flow back to the lower elevation when pumps are turned off or valves are closed. An open topped water tower or vertical water column located between the two elevations and at a higher elevation than a check valve, allows the retrograde flow and shockwave energy to be redirected upwardly into the tower or water column, against the force of gravity, thus harmlessly absorbing the shockwave energy and preventing hydraulic shock.

Buffers, such as tanks filled with a compressible gas, may also be incorporated in fluid systems to absorb shockwave energy and pressure, and reduce or eliminate hydraulic shock. Retrograde flow redirected toward the tank increases the fluid pressure in the tank, which in turn compresses the compressible gas, and shockwave energy is thus absorbed and then fed back into the fluid system by the initial compression and subsequent expansion of the gas after the fluid system returns to nominal operating pressures.

In other mitigation approaches, basic considerations such as valve closing rates, pump rate of stop, and length of straight-line piping between elevations may be adjusted to also reduce or eliminate hydraulic shock.

In the case of pump stoppages, hydraulic shock occurs when a pump stops suddenly, causing a sudden change in fluid flow velocity in piping connected to the pump. Adding a massive flywheel to the pump, for example, slows the rate at which pumping stops when power to the pump is removed, and thus slows the rate of change of fluid flow velocity, so that shock waves are not produced, or their pressure amplitude is minimized Alternatively, short continuous straight-line runs of piping between elevations, such as serpentine pathways, may also minimize hydraulic shock. Bends in a pipeline decrease the total mass of fluid flowing together in a section of pipe in a given direction, and therefore also decrease the total momentum of the fluid flowing in that section of pipe.

Since basic system design considerations may not always adjust to mitigate hydraulic shock, or are cost prohibitive, cushioned check valves have been developed that change the rate of check valve closing to mitigate hydraulic shock. In these prior art cushioned check valves, fluid being pumped from a lower elevation to a higher elevation may stop flowing toward the higher elevation, and reverse direction toward the lower elevation as valves are closed, or pumps stop pumping, while a check valve closes.

For example, a check valve in-line in a lift station between a lower elevation and a higher elevation requires a certain amount of time to close when movement of fluid toward the higher elevation stops, and retrograde flow begins to carry a valve disk backward toward a valve seat until the check valve closes and stops the retrograde flow. The fluid being pumped may therefore develop significant retrograde flow velocity toward the lower elevation that causes hydraulic shock with a significant amount of energy and pressure when the valve disk ultimately closes, and the retrograde flow abruptly stops.

Shockwave mitigation in prior art systems using check valves has focused on forcing the check valve to close at a faster rate than would otherwise occur based on retrograde fluid flow alone forcing a valve disk backward against a valve seat. Ideally, if the valve disk can be made to close at the moment flow stops, and before retrograde flow through the check valve may begin, no hydraulic shock would occur. In actual practice, this ideal timing of the check valve closing is not always achievable.

However, if the rate at which a check valve closes is increased, the faster valve disk closing rate shortens the time retrograde fluid flow has to accelerate toward the closing check valve, and decreases retrograde flow velocity at the moment of check valve closure. Thus, rapid valve closing rates may significantly reduce shockwave energy and pressure, and mitigate hydraulic shock.

In one prior art construction, the Surgebuster® check valve (Mfg.: ValMatic® Valve & Mfg. Corp.) implements a leaf spring on a valve disk that biases the valve disk toward a valve seat, and actively closes the check valve when fluid flow rate through the check valve is reduced below a certain value. Additionally, the check valve is constructed with a short stroke between a fully open position and a fully closed position, shortening the distance the valve disk must move when closing, and further accelerating the check valve closure rate. As a result, fluids flowing through the check valve do not have time to develop significant retrograde velocity toward the valve disk when the valve closes, and hydraulic shock is mitigated.

In some prior art check valve constructions, counterweights are used to accelerate the rate at which a valve disk closes, reducing retrograde flow velocity and shockwave energy and pressure. Accelerating the rate at which a check valve closes in this manner requires additional moving parts that increase manufacturing costs, and create failure points that may result in leaks over time or require shorter service intervals.

In some prior art check valve constructions, acceleration of the valve disk closure rate may also involve components, such as actuators or complex valve seat orientations, that interfere with the fluid flow path through the check valve, and thus reduce over-all flow rates through check valves of a given diameter.

In addition, these mitigation approaches may increase the force necessary to maintain the valve disk in an open position, and thus increase the hydraulic impedance of the fluid flow system. This increased impedance is undesirable as it requires other components, such as pumps downstream from the check valve, to work at higher pressures.

In some other prior art fluid flow systems, such as engine intake manifolds, undesirable transient high pressure pulses may occur in fluid flow channels carrying gaseous phase fluids. Transient high pressure pulses in some engine intake manifolds are undesirable, as an increase in pressure of a gaseous fuel-air fluid mixture in the manifold may result in pre-ignition of the fuel-air mixture, and damage to the manifold or other engine components, including catastrophic failure.

One approach to mitigating transient high pressure pulses in gaseous phase fluid flow systems has been previously described by Kennedy (U.S. Pat. No. 5,186,198, "Intake Manifold Relief Valve", issued 1993). In this prior art construction, transient high pressure pulses forming shockwaves are mitigated in a diesel engine intake manifold via a reactive relief valve. Specifically, a piston under a spring bias moves according to pressure changes in the manifold that exceed a certain rate and amplitude, allowing rapid excessive pressure changes in the manifold to be safely vented to the ambient environment. The relief valve is also designed to rapidly close after venting so that a nominal operating pressure of the intake manifold may be consistently maintained.

SUMMARY OF THE INVENTION

A cushioned check valve of a construction described herein mitigates hydraulic shock in fluid flow systems. The cushioned check valve incorporates a check valve between an outlet and an inlet of a valve body. The check valve is held in an open position by fluid flowing from the inlet of the valve body toward the outlet of the valve body, and is closed by retrograde fluid flow from the outlet of the valve body toward the inlet of the valve body.

A first bypass channel connects the outlet of the valve body with a first end of a hollow cylinder. A second bypass channel connects the inlet of the valve body with a side of the hollow cylinder adjacent the first end of the hollow cylinder and circumferentially around the first end of the hollow cylinder.

A piston in the hollow cylinder is located at the first end of the hollow cylinder, blocking flow through the first bypass channel, the hollow cylinder, and the second bypass channel, when fluid in the outlet of the valve body has a nominal operating pressure.

A diaphragm seals a second end of the hollow cylinder and encloses a fluid volume between the piston and the diaphragm. The diaphragm is also generally biased toward the first end of the hollow cylinder, but is capable of deflecting away from, and back towards, the first end of the hollow cylinder.

A cylinder cover with a gas volume is also located at the second end of the hollow cylinder, and the diaphragm separates the gas volume of the cylinder cover from the internal volume of the hollow cylinder. The diaphragm hermetically seals the gas volume of the cylinder cover, and the second end of the hollow cylinder.

The gas volume of the cylinder cover contains a compressible gas whose pressure is determined by deflections of the diaphragm changing the dimensions of the gas volume of the cylinder cover. The pressure of the compressible gas also acts on the diaphragm and biases the diaphragm toward the first end of the hollow cylinder. Gas pressure may be adjusted by adding or removing gas from the gas volume of the cylinder cover to adjust the bias of the diaphragm.

When the check valve is closed, the fluid pressure in the outlet of the valve body may exceed a nominal operating pressure of the fluid due to a high pressure associated with a transient shockwave. When the fluid pressure in the outlet of the valve body is greater than the bias of the diaphragm, the fluid pressure in the outlet, translating through the first bypass channel, forces the piston toward the second end of the hollow cylinder. This motion of the piston moves the fluid volume between the piston and the diaphragm toward the diaphragm, deflects the diaphragm toward the gas volume of the cylinder cover, and increases the pressure of the compressible gas contained therein. Thus, the bias of the diaphragm toward the hollow cylinder increases as well.

The piston moves toward the second end of the hollow cylinder until a second force, associated with the pressure in the fluid volume and the diaphragm bias, acting on the piston from the second end of the hollow cylinder, equalizes to a first force associated with the pressure of the fluid in the outlet of the valve body and the first bypass channel, acting on the piston from the first end of the hollow cylinder. Alternatively, the piston may move to the second end of the hollow cylinder and be restrained by a retaining ring.

When the piston has moved toward the second end of the cylinder, the piston no longer prevents fluid flow through the first bypass channel, into the hollow cylinder, and out of the hollow cylinder through the second bypass channel.

Thus, shockwave pressure at the outlet of the valve body is shunted from the outlet of the valve body, around the check valve, through the hollow cylinder, and into the inlet of the valve body which is at a lower pressure. This shunting dissipates the excess pressure of the shockwave by moving the piston against the diaphragm bias and filling the hollow cylinder between the piston and the first end of the hollow cylinder, as well as fluid being forced through an aperture in the piston that allows the fluid to move from the first end of the hollow cylinder, through the piston, to the fluid volume between the piston and the diaphragm. Any residual transient pressure associated with the shockwave may also bypass the check valve through the second bypass channel and naturally dissipate at the inlet of the check valve.

When the fluid pressure acting on the piston from the first end of the hollow cylinder equalizes with the pressure on the piston from the diaphragm bias, as a result of fluid flow through the aperture of the piston, the first force acting on the piston and biasing the piston toward the diaphragm is determined by the fluid pressure in the in the first end of the hollow cylinder multiplied by an area of a portion of a sealing surface, and a lower surface of the piston defined by a piston chamber internal to the piston that is open to the first end of the hollow cylinder.

The second force acting on the piston and biasing the piston toward the first end of the hollow cylinder is determined by the diaphragm bias multiplied by an area of an upper surface of the piston. Since the diaphragm bias and the pressure at the first end of the hollow cylinder have equalized, and the area of the upper surface of the piston is effectively larger than the area of the area of the piston sealing surface and lower surface of the piston, a net force on the piston moves the piston back toward the first end of the hollow cylinder, where it again blocks flow and pressure transfer between the first bypass channel and second bypass channel. In this manner, transient high pressure pulses in the form of shock waves in the fluid are dissipated, and hydraulic shock is mitigated.

When the piston has returned to the first end of the hollow cylinder, and the fluid pressure in the outlet of the hollow body and the first bypass channel has returned to a nominal operating pressure, fluid in the fluid volume between the piston and the diaphragm is forced back through the central aperture of the piston by the now higher pressure of the diaphragm bias.

As fluid in the fluid volume between the piston and the diaphragm is forced through the central aperture of the piston into the first bypass channel, the diaphragm deflects toward the first end of the hollow cylinder; the gas volume of the cylinder cover increases, the pressure of the compressible gas contained in the gas volume of the cylinder cover decreases, and the diaphragm bias equalizes to the nominal pressure of the fluid in the outlet of the hollow body.

BRIEF DESCRIPTION OF THE DRAWINGS

FIG. 1 shows a cushioned check valve embodiment prior to pressurization a fluid flow system the cushioned check valve is installed in.

DETAILED DESCRIPTION OF THE INVENTION

A cushioned check valve of an embodiment of the current invention that effectively reduces the rate at which changes in fluid flow velocity occur, without directly interacting with the operation of check valve elements, provides several advantages over the prior art. One advantage is that no mechanical components are added in a check valve flow channel, thus flow rates through the check valve are not negatively affected. Similarly, no counter weights or springs are used that would add closing force to the check valve, and no modifications of a check valve seat location or orientation are needed. As a result, the check valve cross-sectional area may be optimized without relying on increased operating pressures to maintain the check valve in an open condition, and fluid flow through the check valve is not restricted by the cushioned check valve.

Another advantage is that the cushioned check valve is easily adjustable to a wide range of fluid flow velocities, fluid pressures, and pipe diameters, and is also adaptable to a wide range of fluids, including, but not limited to, for example, water, sewage, chemicals, and others.

Figure 1:
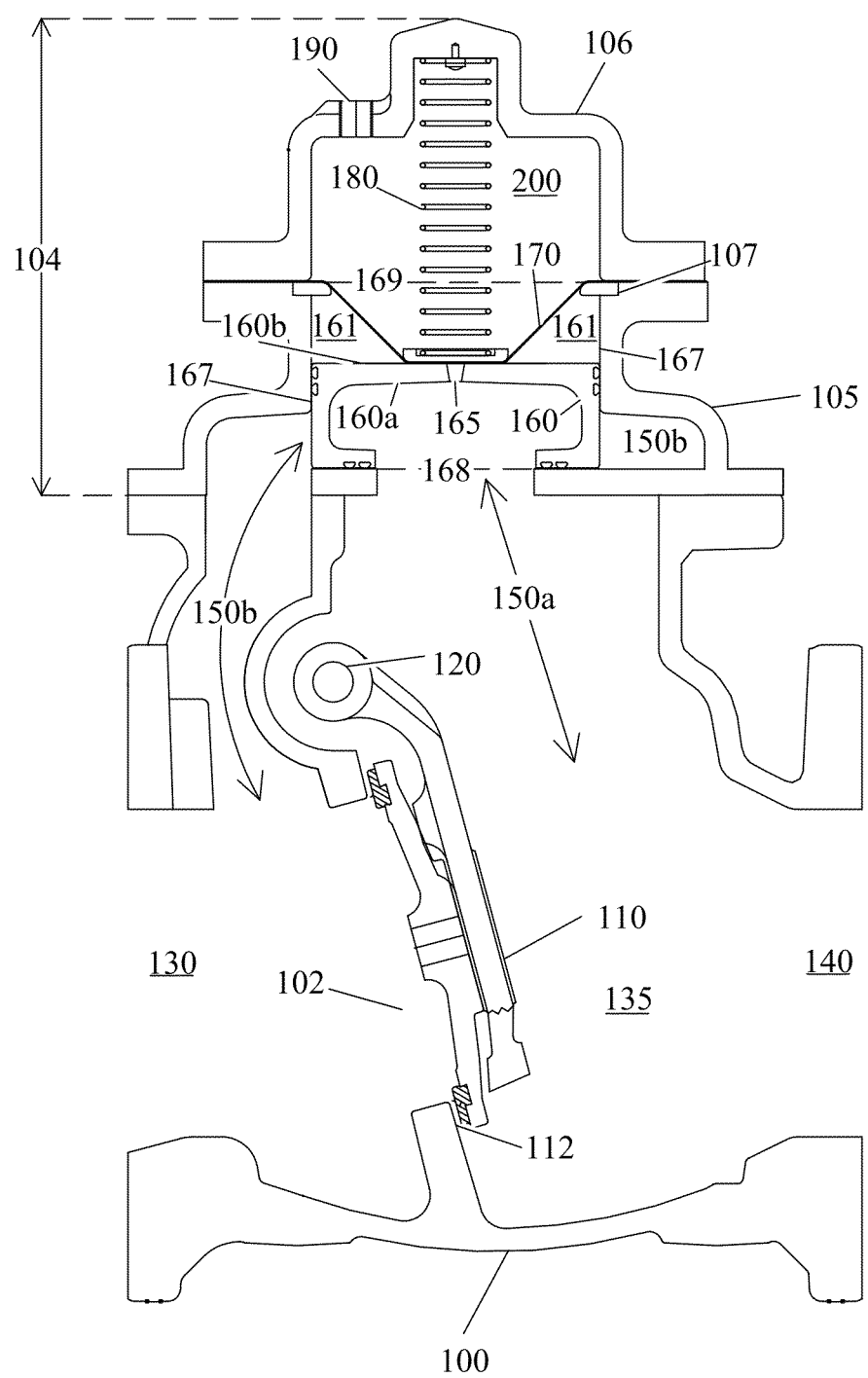

FIG. 1 illustrates the elements of the cushioned check valve prior to pressurization of a fluid flow system. In this embodiment, a valve body 100 has an inlet 130 and an outlet 140. A check valve closing member 102 allows fluid flow in one direction and blocks flow in the other. The closing member 102 is here shown as a swing-type check valve in which a valve disk assembly 110 moves on a hinge 120, so that the valve disk assembly 110 may swing away from a valve seat 112 and out of a flow channel 135 between the inlet 130 and the outlet 140 to allow flow when fluid flow is biased from the inlet 130 toward the outlet 140. As is customary with check valves, when fluid flow reverses direction and becomes retrograde, with fluid flow moving from the outlet 140 toward the inlet 130, the retrograde fluid flow carries the valve disk assembly 110 back toward the valve seat 112, stopping the retrograde fluid flow.

It will be understood that while in the embodiments described herein the check valve closing member 102 is a swing-type check valve in which a disk assembly 110 swivels on hinge 120 to seat against valve seat 112, the cushioned check valve described herein may be combined with other types of check valves, including but not limited to lift valves, diaphragm valves, ball valves, and others.

The valve body 100 is attached to a valve cushion assembly 104 that includes a piston housing 105 forming a hollow cylinder 167. At its first end 168, the hollow cylinder 167 is open to the flow channel 135 through a first bypass channel 150a. Thus, according to Pascal's law, the fluid pressure at the first end 168 of the hollow cylinder 167 will be the same as the pressure of the fluid in the outlet 140 and the first bypass channel 150a.

The hollow cylinder 167 also includes a retaining ring 107 at a second end 169 of the hollow cylinder 167. The hollow cylinder 167 is also open to a second bypass channel 150b at a side of the hollow cylinder 167 adjacent the first end 168 of the hollow cylinder 167. The second bypass channel 150b is generally arranged to meet the first end 168 of the hollow cylinder 167 about the circumference of the hollow cylinder 167, and may do so continuously or through discreet openings passing from the second bypass channel 150b into the hollow cylinder 167.

The hollow cylinder 167 houses a movable piston 160 that is generally free to move between the first end 168 of the hollow cylinder 167 and the second end 169 of the hollow cylinder 167. The piston 160 may incorporate a variety of seals, including, but not limited to, piston rings, O-rings, and other seals that prevent passage of fluid around the piston 160 into the hollow cylinder 167, or under the piston 160, between the first bypass channel 150a and second bypass channel 150b.

Figure 6:
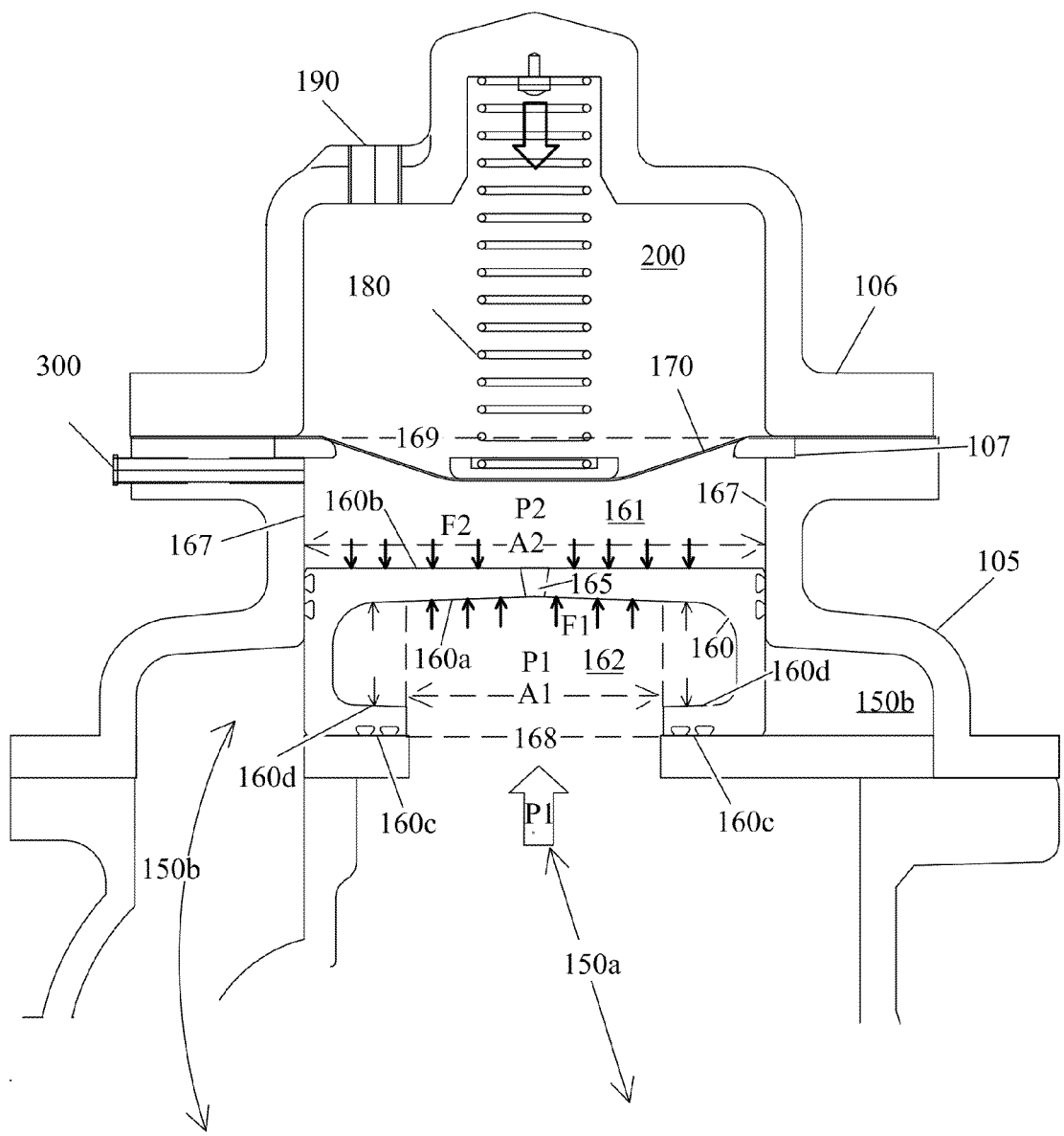
FIG. 6 shows a detail of the piston, cylinder cover, and hollow cylinder a pressure in a first bypass channel with a diaphragm bias equal a nominal operating pressure, and the areas over which opposing forces act on the piston.
Figure 7:
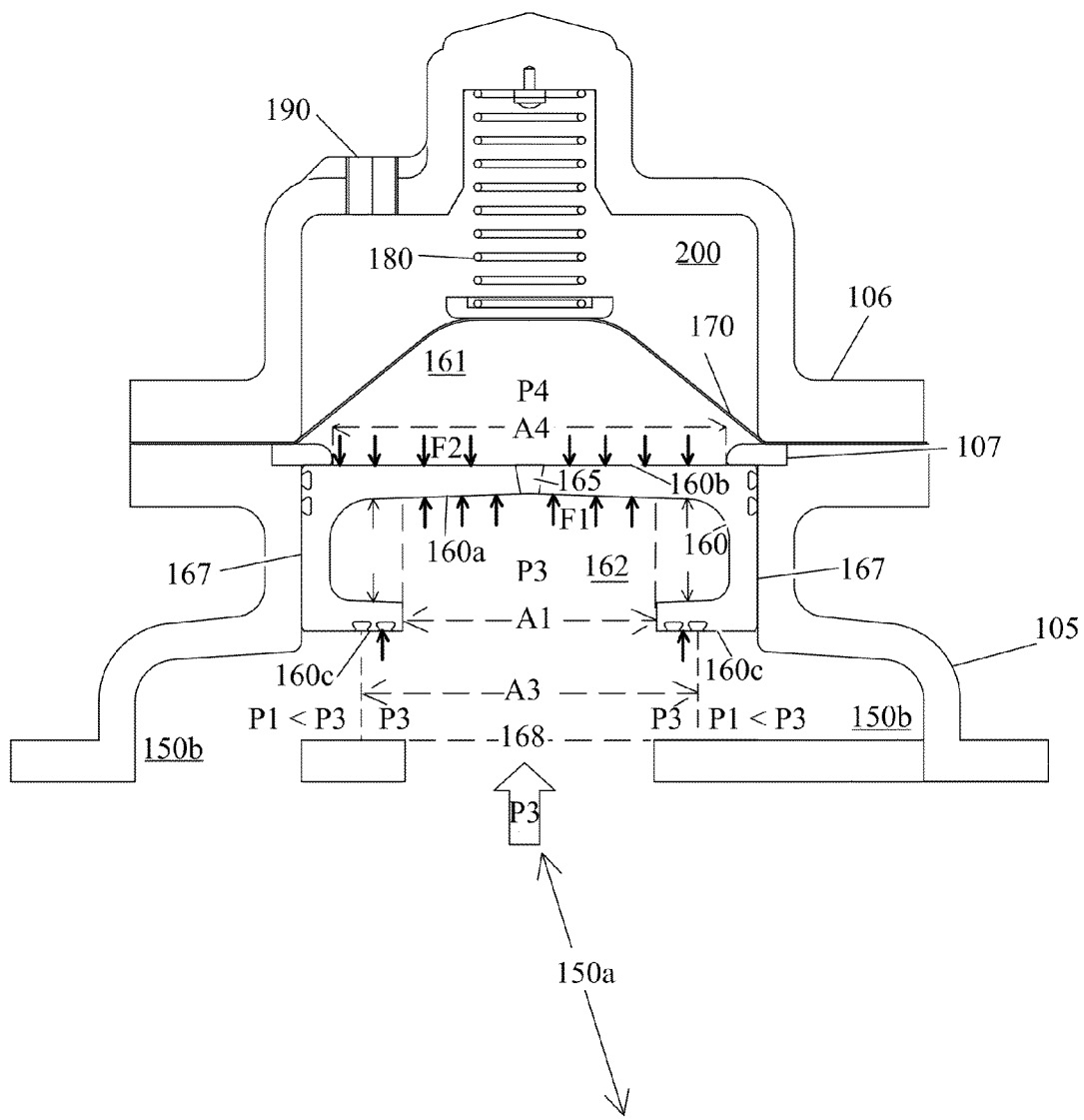
FIG. 7 shows a detail of the piston, cylinder cover, and hollow cylinder after equalization of shockwave pressure in a first bypass channel with a diaphragm bias, and the areas over which opposing forces act on the piston after a shock wave event.

As shown in FIG. 6 and FIG. 7, the piston 160 also defines a piston chamber 162 with a surface inside the piston 160. The piston chamber 162 defines a first side 160a of the piston 160. An opening from the piston chamber 162 to the first end 168 of the hollow cylinder 167 is defined by an extent of a piston seal surface 160c. The piston 160 also includes a central aperture 165 that allows fluid to pass through the piston 160 between the first side 160a and a second side 160b of the piston 160.

Referring again to FIG. 1, a diaphragm 170 is located at the second end 169 of the hollow cylinder 167 and forms a hermetic seal with the piston housing 105. Thus, the second side 160b of the piston 160, the diaphragm 170, and the hollow cylinder 167 define a fluid volume 161 between the second side 160b of the piston 160 and the diaphragm 170. The diaphragm 170, is generally biased toward the first end 168 of the hollow cylinder 167, but is free to deflect away from the first end 168 of the hollow cylinder 167 and back toward the first end 168 of the hollow cylinder 167, as will be discussed further herein. Bias of the diaphragm 170 may be altered, if desired, by various constructions, including, but not limited to, a selection of material from which the diaphragm 170 is constructed, a thickness of the diaphragm 170, surface features on the diaphragm 170, and other structural features.

A hollow cylinder cover 106 is located at the second end 169 of the hollow cylinder 167, and is attached to the piston housing 105. The diaphragm 170 hermetically seals the cylinder cover 106 and defines a gas volume 200 inside the cylinder cover 106.

The gas volume 200 is filled with a compressible gas. Generally, the compressible gas will be air. However, any compressible gas such as nitrogen, for example, or combination of compressible gasses, may be used. The pressure of the compressible gas within the gas volume 200 may be adjusted, for example, during initialization and optimization of the cushioned check valve, by introducing or removing gas through an adjustment valve 190, with an open position and a closed position, that passes through the cylinder cover 106.

The bias of the diaphragm 170 toward the first end 168 of the hollow cylinder 167 is also determined by the pressure of the gas in the gas volume 200. Higher gas pressures in the gas volume 200 provide a stronger bias, and lower pressures provide a weaker bias. A diaphragm return spring 180 may optionally be incorporated between the diaphragm 170 and the cylinder cover 106 to provide additional bias to the diaphragm 170. Thus, the diaphragm 170 bias may be determined by the construction of the diaphragm 170, the pressure of the gas in the gas volume 200, and optionally, the bias of the return spring 180.

Figure 2:
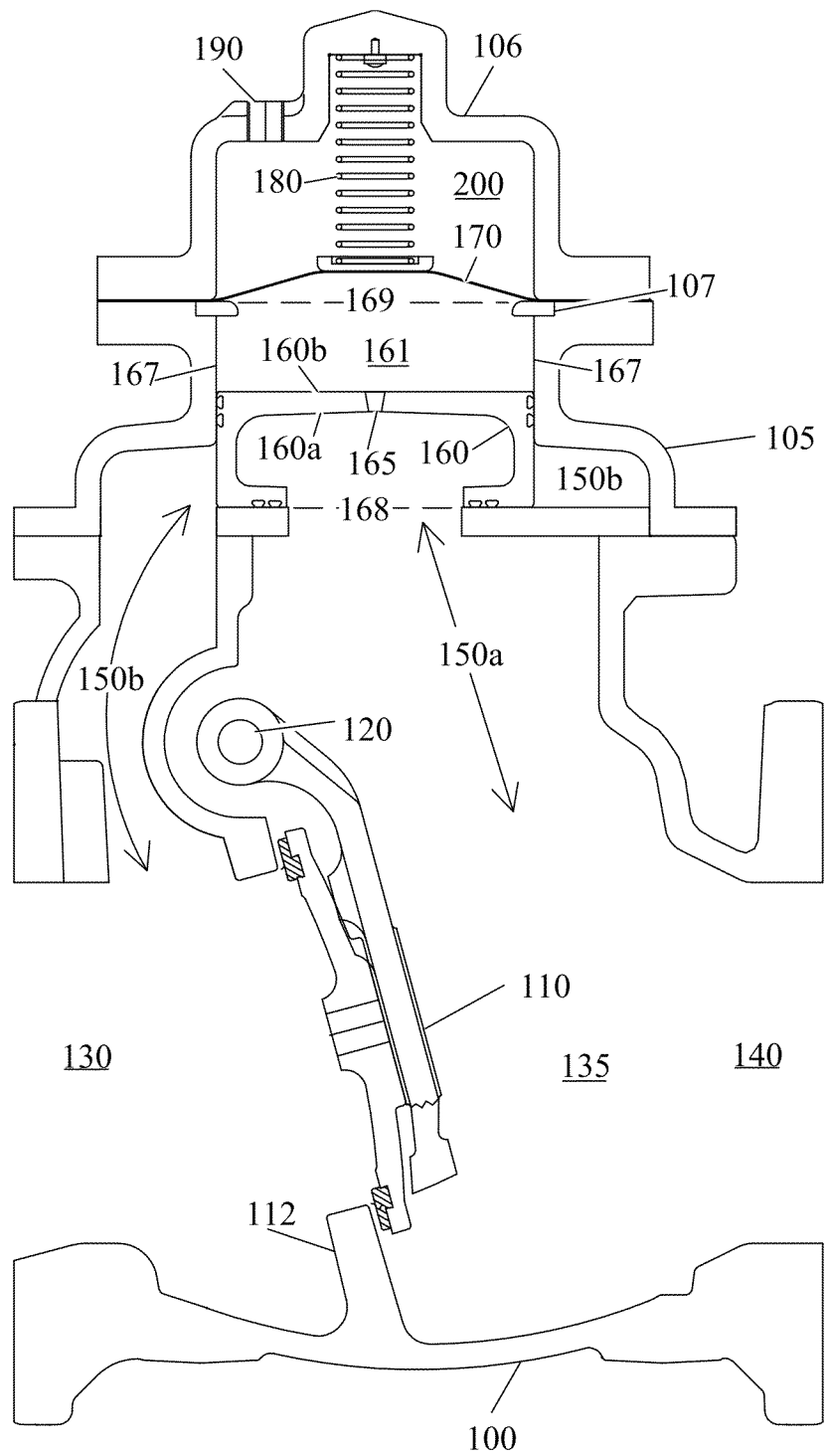
FIG. 2 shows a cushioned check valve embodiment after initial pressurization of the flow system in which it is installed.

FIG. 2 illustrates the cushioned check valve after the flow channel 135 has been charged with a fluid at a nominal operating pressure. Fluid is present at a constant pressure in the flow channel 135 and outlet 140, but no flow is present in the flow channel 135 or outlet 140, being blocked by the check valve disk assembly 110.

When the fluid channel 135 is filled with fluid, the fluid flows into the first bypass channel 150a, into the first end 168 of the hollow cylinder 167, through the central aperture 165 of the piston 160 and into the fluid volume 161. The pressure of the fluid in the flow channel 135 may therefore deflect the diaphragm 170 away from the first end 168 of the hollow cylinder 167, compressing the return spring 180, if present, and the compressible gas in the gas volume 200, until the pressure of the fluid in the flow channel 135 and the bias of the diaphragm 170 are equalized.

Figure 3:
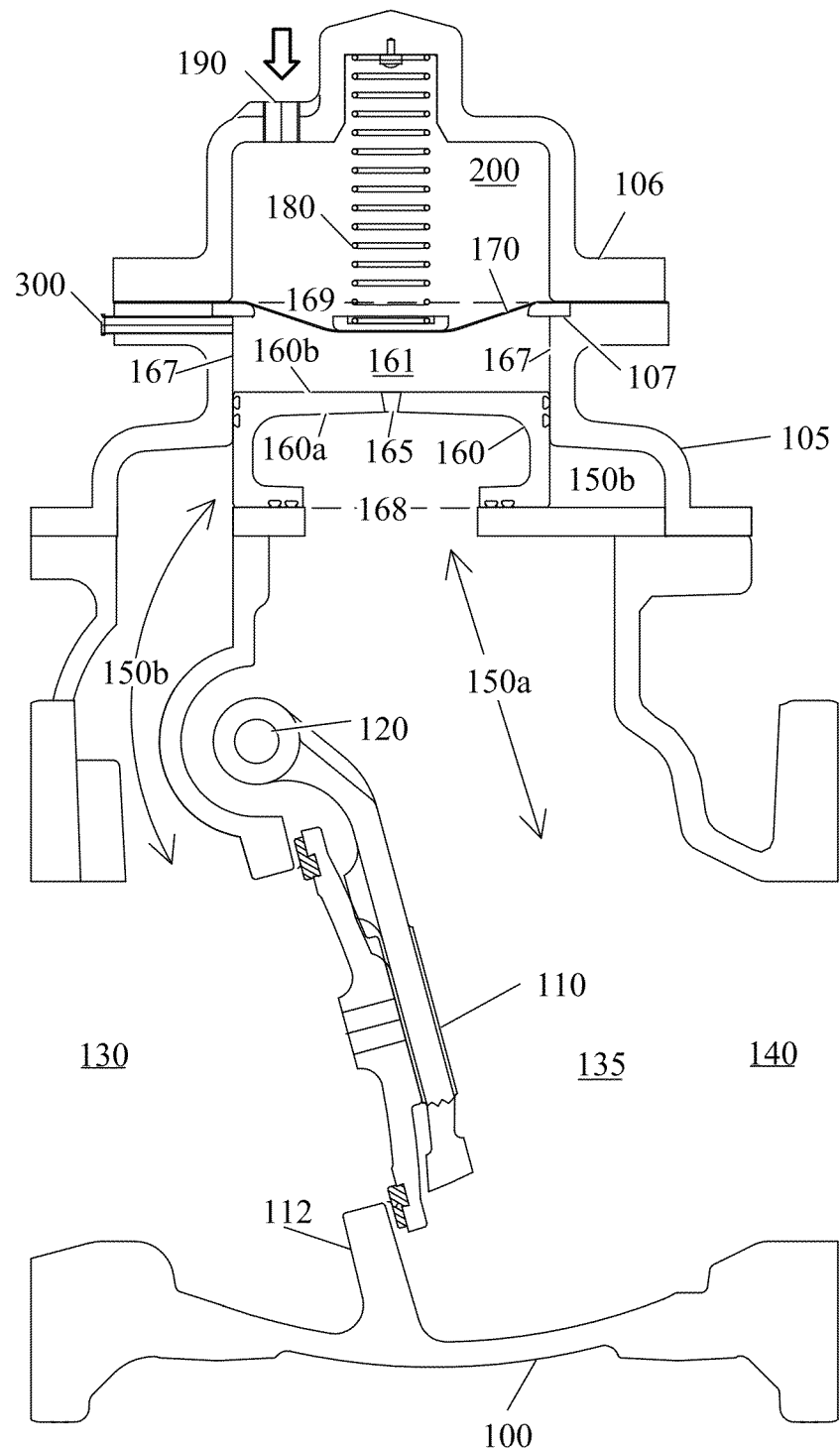
FIG. 3 shows a cushioned check valve embodiment after initial pressurization of the flow system and adjustment of gas pressure in the gas volume of the cylinder cover.

As shown in FIG. 3, gas may be introduced into the adjustment valve 190 as indicated by the large arrow above the adjustment valve 190. Adding gas to the gas volume 200 increases the gas pressure in the gas volume 200, and increases the bias of the diaphragm 170. Thus, relative to the position of the diaphragm 170 shown previously in FIG. 2, the diaphragm 170 deflects back toward the first end 168 of the hollow cylinder 167. In some embodiments, a bleeder valve 300 may be incorporated through the piston housing 106 adjacent the diaphragm 170, so that air may be bled out of the fluid volume 161 between the piston 160 and the diaphragm 170. The fluid volume 161, whether partially filled with air or completely filled with fluid, couples the bias of the diaphragm 170 to the second side 160b of the piston 160.

The central aperture 165 of the piston 160 is dimensioned so that fluid may only flow between the first side 160a and second side 160b of the piston 160 at a limited rate. As a result, when changes in pressure at the first end 168 of the hollow cylinder 167 occur at a rate that can be accommodated by the central aperture 165, the fluid may move through the central aperture 165 without moving the piston 160 away from the first end 168 of the hollow cylinder 167. Within these operating parameters, pressure changes that occur below a given rate, determined by the dimensions of the central aperture 165, may be absorbed by deflections of the diaphragm 170 against the diaphragm bias and the piston 160 will remain at the first end 168 of the hollow cylinder 167.

Provided the piston 160 is located at the first end 168 of the hollow cylinder 167, fluid flow from the first bypass channel 150a to the second bypass channel 150b is blocked by the piston 160. Similarly, as indicated by the negated arrow shown in FIG. 4, the pressure of the fluid in the second bypass channel 150b has no effect in moving the piston 160, since the pressure of the fluid in the second bypass channel 150b acts laterally on the piston 160 at a perimeter of the piston 160, and lateral motion of the piston 160 is precluded by the hollow cylinder 167 defined by the cylinder housing 105.

Figure 4:
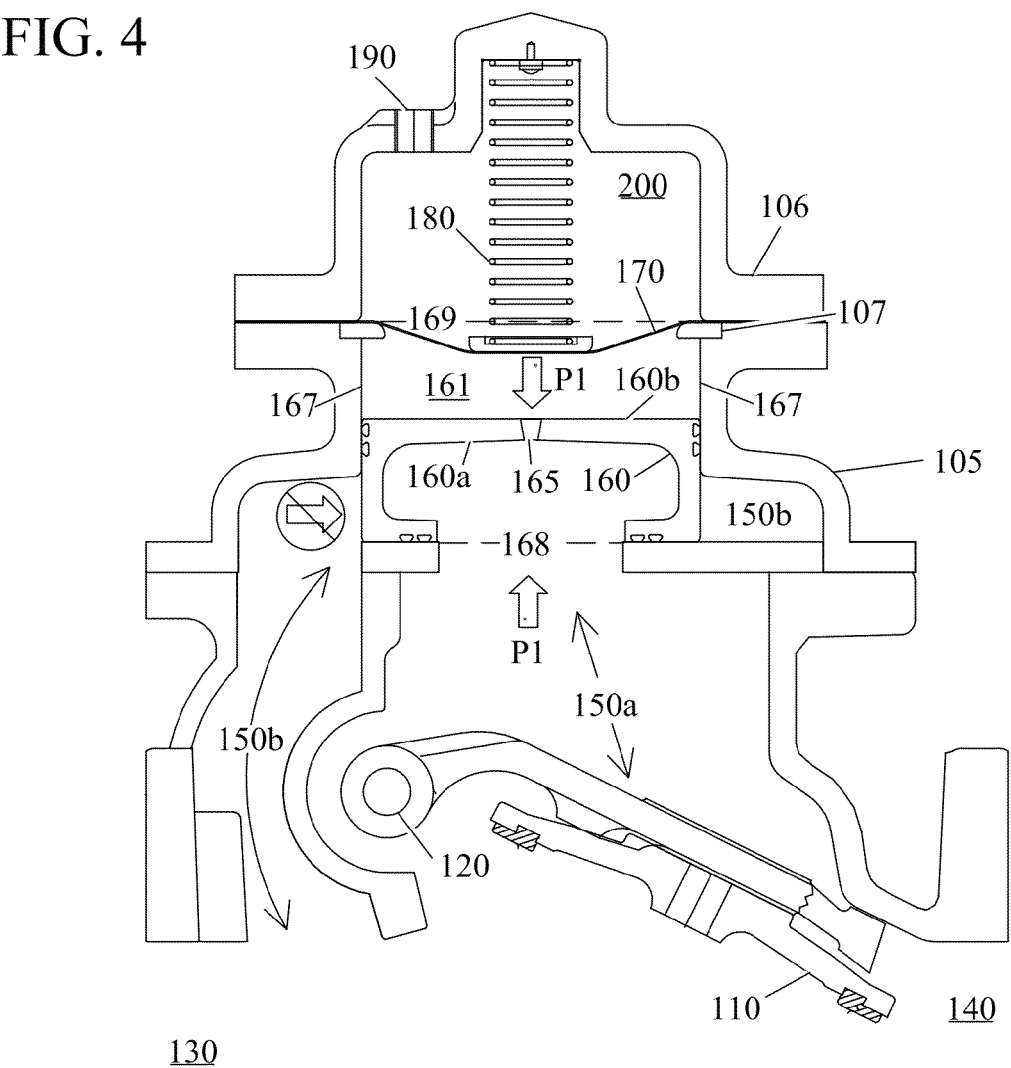
FIG. 4 shows a cushioned check valve embodiment during steady state flow of a fluid from the inlet to the outlet of the cushioned check valve.
Figure 4:
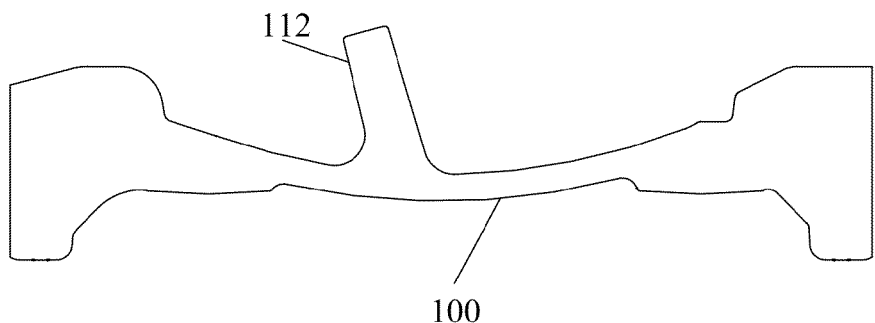

Still referring to FIG. 4, the cushioned check valve is illustrated when fluid flow is present in the flow channel 135 in a direction from the inlet 130 toward the outlet 140, and with a nominal operating pressure P1, and no retrograde flow or hydraulic shock occurring. Fluid flowing from the inlet 130 through the flow channel 135 forces the valve disk assembly 110 away from the valve seat 112, and forward fluid flow progresses in the conventional manner toward the outlet 140.

Provided the fluid pressure in the outlet 140 is within nominal operational ranges, in this case nominally pressure P1, and is not rapidly changing, the fluid pressure in the first bypass channel 150a acting on the first side 160a of the piston 160, and the pressure P2 from the diaphragm bias coupled to the second side 106b of the piston 160 through the fluid volume 161, are equalized, and the piston 160 remains at the first end 168 of the hollow cylinder 167. The piston 160, therefore blocks the first bypass channel 150a and the second bypass channel 150b, so that no fluid flows through the first bypass channel 150a, into the hollow cylinder 167, and out the second bypass channel 150b into the inlet 130 the valve body 100, and vice versa.

The forces acting on the piston 160 when fluid pressure is within nominal operating parameters are shown in more detail in FIG. 6. The second side 106b of the piston 160 has an area A2, and a force biasing the piston 160 toward the first end 168 of the hollow cylinder 167, shown as bold downward pointing arrows, may be calculated as:

$$F2 = P2 \times A2 \qquad (\text{Eq. 1})$$

The piston 160 also defines a piston chamber 162 internal to the piston 160, and the piston chamber 162 is open to the first end 168 of the hollow cylinder 167. In this embodiment, the opening in the piston chamber 162 to the first end 168 of the hollow cylinder 167 has an area A1 that is defined by an extent of piston seal surfaces 160c that are part of the piston 160. The projection of area A1 onto the first side 160a of the piston 160 is shown by vertical dashed lines in FIG. 6.

Pascale's law dictates that fluid pressure is distributed uniformly in all directions, and applies to fluid pressure P1 in the piston chamber 162. As a result, forces caused by fluid pressure outside the area A1, and its projection onto the first side 160a of the piston 160 within the piston chamber 162, shown by narrow upward and downward arrows in FIG. 6, acting on the first side 160a of the piston 160 and a surface 160d of the piston chamber 162, defined by an extent of the piston seal surfaces 160c, cancel each other out, and result in a net zero force acting on the piston 160.

The remaining forces acting on the first side 160a of the piston 160 within the area A1, shown by bold arrows in FIG. 6, may be calculated as:

$$F1 = P1 \times A1 \qquad (Eq. 2)$$

When the fluid pressure is within nominal operational parameters and equalized between fluid volume 161 and the first end 168 of the hollow cylinder 167, P1=P2. As A1 is significantly less than A2, F2 is therefore greater than F1, and a net force acts on the second side 160b of the piston 160, and maintains the piston 160 at the first end 168 of the hollow cylinder 167 regardless of the spatial orientation of the cushioned check valve. The areas A1 and A2 may be selected to determine a pressure differential between P1 and P2 that would alter the relationship between F1 and F2. For example, enlarging A1 to be closer in value to A2 may reduce the amount of excess pressure at the first end 168 of the hollow cylinder 167 that would be required to move the piston 160 toward the second end 169 of the hollow cylinder 167, and vice versa.

Figure 5:
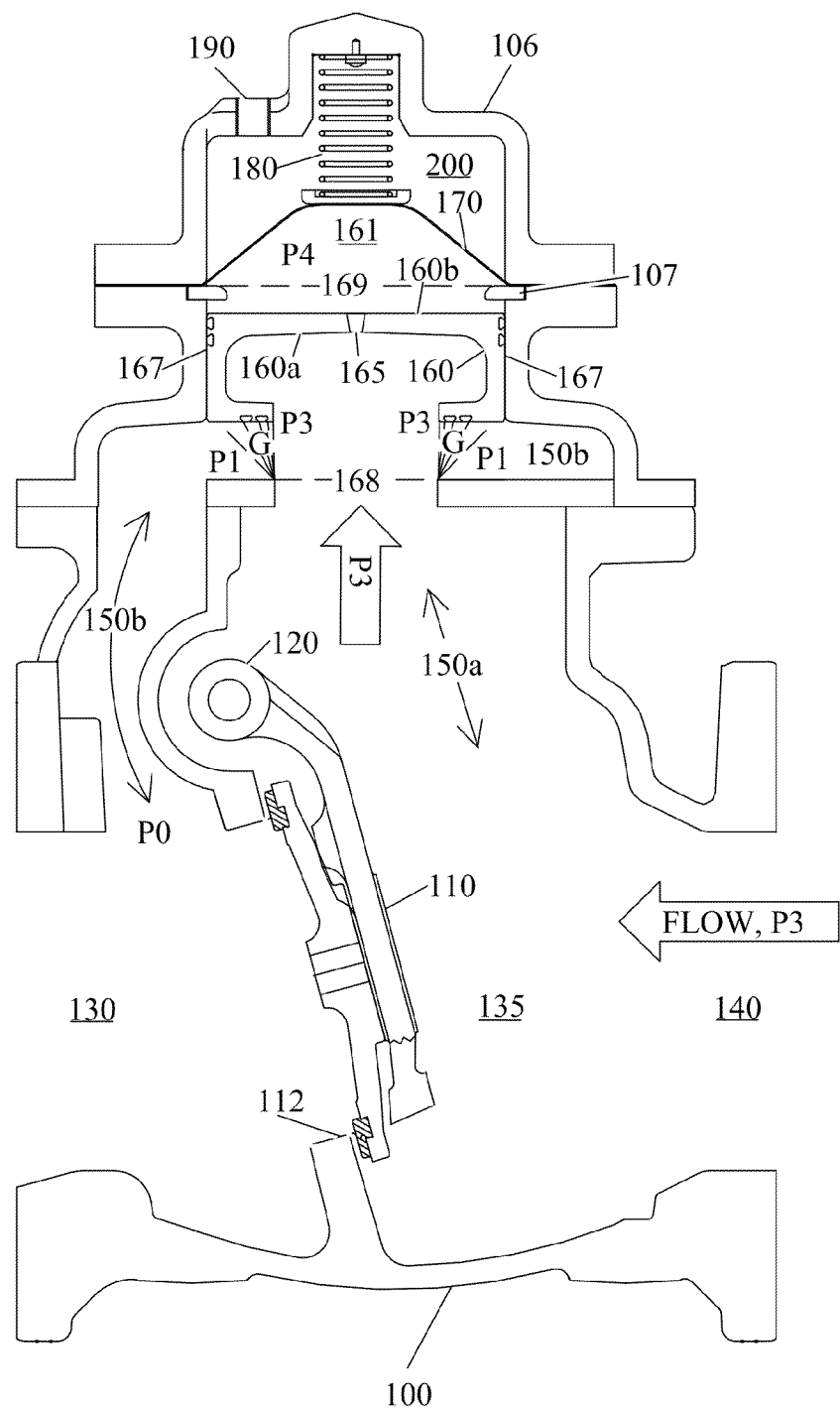
FIG. 5 shows a cushioned check valve embodiment when a retrograde high pressure pulse enters the check valve moving from the outlet toward the inlet of the cushioned check valve.

Referring now to FIG. 5, the cushioned check valve is illustrated in a condition where forward fluid flow from the inlet 130 to the outlet 140 is stopped, for example when a pump driving the fluid system turns off. As the force moving the fluid stops, the momentum of the moving fluid may continue its flow away from the valve for a short time, after which the fluid will return to flow backward against the valve disk assembly 110, which closes and seats on valve seat 112. This may also cause a hydraulic shockwave or other transient high pressure pulse, with a pressure P3, at the outlet 140 and in flow channel 135.

Prior art check valves may be subject to hydraulic shock during a fluid flow stoppage when the valve disk 110 closes against the valve seat 112, and the resulting shockwave impacts the closed valve disk 110. However, as shown in FIG. 5, the first bypass channel 150a diverts the shockwave pressure, a transient pressure pulse with a pressure P3 that is higher than the pressures P1, to the first end 168 of the hollow cylinder 167, the piston chamber 162, and the first side 160a of the piston 160.

The second side 160b of the piston 160, in contrast, is coupled through the fluid volume 161 to the diaphragm 170, and is exposed to a pressure P4 that is still equal to the diaphragm bias according to nominal operating pressure P1 of the fluid in the first bypass channel 150a. Thus, a pressure differential forms between the first side 160a of the piston 160, at the pressure P3 that is much higher than nominal operating pressure P1, and the second side 160b of the piston 160, at a pressure of P2=P1.

In the case of hydraulic shock, the pressure differential may form at a higher rate than the central aperture 165 of the piston 160 may accommodate. Therefore, the dimensions of the central aperture 165 of the piston 160 present an hydraulic impedance, so the pressure differential, caused by the high pressure transient shockwave, across the piston 160 cannot immediately equalize through the central aperture 165 of the piston 160.

As a result of the hydraulic impedance of the central aperture 165 of the piston 160, and the pressure differential, P2=P1<P3, formed between the first side 160a and second side 160b of the piston 160, the piston 160 may be forced toward the second end 169 of the hollow cylinder 167, against the diaphragm bias coupled to the second side 160b of the piston 160 through the fluid volume 161. The fluid volume 161 is thus forced toward the diaphragm 170 as the piston 160 moves. The diaphragm 170 consequently deflects away from the first end 168 of the hollow cylinder 167 and compresses the gas in the gas volume 200, and the return spring 180, when present, until the bias of the diaphragm 170 acting on the second side 160b of the piston 160 through the fluid volume 161 equalizes to the higher fluid pressure P4=P3, acting on the first side 160a of the piston 160.

When the piston 160 moves away from the first end 168 of the hollow cylinder 167, the first bypass channel 150a opens to the hollow cylinder 167, and the hollow cylinder 167 opens to the second bypass channel 150b at a side of the hollow cylinder 167 near the first end of the hollow cylinder 167. Pressure in the outlet 140 of the hollow valve body 100 may thus be relieved around the check valve 110, 112 to the inlet 130 of the valve body 100 as well as be dissipated by the deflection of the piston 160. Also, a pressure gradient G is created between the first end 168 of the hollow cylinder 167, at pressure P3, and the second bypass channel 150b, still at P1.

Applying the force balance described in relation to FIG. 6 to FIG. 7, the area A4 remains larger than A3, and is equal to A2 when the piston 160 is between the first end 168 of the hollow cylinder 167 and second end 169 of the hollow cylinder 167, or is diminished slightly when the piston 160 is at an extreme location next to the retaining ring 107. In these states, the force F2 biasing the piston 160 toward the first end 168 of the hollow cylinder 167 is calculated as:

$$F2 = P2 \times A2, \text{ or} \qquad (Eq. 1)$$

$$F2 = P2 \times A4 \qquad (Eq. 3)$$

because the pressure P4, which is still equal to P2, within the fluid volume 161 has not yet equalized to the pressure P3 at the first end 168 of the hollow cylinder 167. However, the force F1 biasing the piston 160 toward the second end 169 of the hollow cylinder 167 is now calculated as:

$$F1 = P3 \times A3 \qquad (Eq. 4)$$

When P3 is sufficiently large, the force F1 is greater than the force F2, and a net force acting on the first side 160a of the piston 160 moves the piston 160 toward the second end 169 of the hollow cylinder 167. Thus, the by-pass channels 150a and 150b may communicate with each other through the hollow cylinder 167.

Referring still to FIG. 7, when the piston 160 has moved to an extreme against the retaining ring 107, fluid at a pressure P3 is forced through the aperture 165 of the piston 160, until the pressure P4 within the fluid volume 161 equalizes to P3, so that P4=P3. At this extreme position, the area A4 though which fluid pressure may act on the second side 160b of the piston 160 is slightly less than area A2, as a result of blockage by the retaining ring 107. The force F2 acting on the second side 160b of the piston 160 is now calculated as:

$$F2 = P4 \times A4 \quad \text{(Eq. 5)}$$

At the same time, the area A1 of first side 160a of the piston 160 enlarges to area A3 and includes a portion of the pressure gradients G, shown in FIG. 5, acting on the piston seating surfaces 160c. Hence, the force F1 applied to the piston 160 in a direction toward the second end 169 of the hollow cylinder 167 is calculated as:

$$F1 = P3 \times A3 \quad \text{(Eq. 4)}$$

As area A4 is still greater than A3, and P4 now equals P3, the forces acting on the piston 160 return to a condition in which F2 is greater than F1, and the piston 160 is biased toward the first end 168 of the hollow cylinder 167.

When the piston 160 has fully returned to the first end 168 of the hollow cylinder 167, the connection between the first bypass channel 150a and the second bypass channel 150b at the bottom of the hollow cylinder 167 is once again closed.

Movement of the piston 160, and fluid flow through the bypass channels 150a, 150b and hollow cylinder 167, only permits a small amount of retrograde flow around the check valve, but effectively slows the rate of change of fluid pressure from P1 to P3 in the cushioned check valve, and also allow excess pressure to by-pass the check valve, such that hydraulic shock is mitigated.

When the piston 160 has fully returned to the first end 168 of the hollow cylinder 167 and the shockwave pressure P3 has dissipated so that fluid pressure in the outlet 140 returns to a nominal operating pressure P1, the diaphragm 170 bias forces fluid in the fluid volume 161 back through the central aperture 165 of the piston 160 into the first bypass channel 150a, and the valve is prepared to react to, and mitigate, subsequent shock wave events as described herein.

While the cushioned check valve described herein has been shown as an integrated unit, with the valve body 100, the piston housing 105, and cylinder cover 106 mating together to form a first bypass channel 150a and a second bypass channel 150b, this illustration should not be considered limiting on the apparatus. For example, valve cushion assembly 104 elements including the piston housing 105 forming a hollow cylinder 167, the piston 160, the diaphragm 170, and the cylinder cover 106 described herein may be combined as an independent valve cushion assembly 104 that may be connected to a separate valve body 100 containing a check valve by, for example, hydraulic pipes or hoses which may define bypass channels 150a, 150b.

In this manner, a variety of manufacturing techniques may be employed in the construction of the cushioned check valve. Similarly, the valve cushion assembly 104 may be added to existing check valves through appropriate modifications of their valve bodies to accept hydraulic pipes, hoses, or other channels defining a first bypass channel 150a and a second bypass channel 150b adjacent to valve body inlets and outlets that connect the valve cushion assembly 104 and valve body 100.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A cushioned check valve, comprising:
   a) a hollow valve body having an inlet, an outlet, and a flow channel between the inlet and the outlet;
   b) a check valve closing member in the flow channel of the hollow valve body having an open position permitting a fluid to flow from the inlet of the hollow valve body toward the outlet of the hollow valve body, and a closed position blocking the fluid flow from the outlet toward the inlet of the hollow valve;
   c) a cylinder housing on the hollow valve body having an interior in the form of a hollow cylinder with a first end in communication with the outlet of the hollow valve body through a first bypass channel, a second end opposite the first end, and a cylindrical side therebetween,
   d) a second bypass channel in the side of the hollow cylinder adjacent the first end of the hollow cylinder, coupling the first end of the hollow cylinder to the inlet of the valve body;
   e) a piston located within the hollow cylinder and slidable between a first position adjacent to the first end of the hollow cylinder and a second position adjacent to the second end of the hollow cylinder, the piston comprising a piston chamber inside the piston having an opening adjacent to the first end of the hollow cylinder and a central aperture passing through an end of the piston opposite the opening, such that, when the piston is at the first position, the piston blocks the first bypass channel and the second bypass channel and when the piston is in the second position, a path is opened for fluid flow between the first bypass channel and the second bypass channel;
   f) a cylinder cover defining a compressible gas volume in fluid communication with the second end of the hollow cylinder; and
   g) a flexible diaphragm separating the compressible gas volume of the cylinder cover from the second end of the hollow cylinder; the diaphragm being biased toward the first end of the hollow cylinder and defining a fluid volume in the hollow cylinder between the diaphragm and the end of the piston.

2. The cushioned check valve of claim 1, wherein the check valve closing member is a swing check valve comprising a hinged valve disk assembly seating on a valve seat.

3. The cushioned check valve of claim 1, wherein the cylinder cover further comprises an adjustment valve passing through the cylinder cover between an outside of the cylinder cover and the compressible gas volume.

4. The cushioned check valve of claim 1, further comprising a diaphragm return spring between the diaphragm and the cylinder cover, applying a bias force against the flexible diaphragm toward the first end of the hollow cylinder.

5. The cushioned check valve of claim 1, wherein the cylinder housing further comprises a bleeder valve providing a closable path from the second end of the hollow cylinder to an outside of the cylinder housing.

6. A cushion for a check valve comprising a hollow valve body having an inlet, an outlet, and a flow channel between the inlet and the outlet, with a check valve closing member in the flow channel of the hollow valve body having an open position permitting a fluid to flow from the inlet of the hollow valve body toward the outlet of the hollow valve body, and a closed position blocking the fluid flow from the outlet toward the inlet of the hollow valve; the cushion comprising:
   a) a cylinder housing mountable on the hollow valve body, having an interior in the form of a hollow cylinder with a first end in communication with the outlet of the hollow valve body through a first bypass channel, a second end opposite the first end, and a cylindrical side therebetween, b) a second bypass channel in the side of the hollow cylinder adjacent the first end of the hollow cylinder, coupling the first end of the hollow cylinder to the inlet of the valve body;
c) a piston located within the hollow cylinder and slidable between a first position adjacent to the first end of the hollow cylinder and a second position adjacent to the second end of the hollow cylinder, the piston comprising a piston chamber inside the piston having an opening adjacent to the first end of the hollow cylinder and a central aperture passing through an end of the piston opposite the opening, such that, when the piston is at the first position, the piston blocks the first bypass channel and the second bypass channel and when the piston is in the second position, a path is opened for fluid flow between the first bypass channel and the second bypass channel;
d) a cylinder cover defining a compressible gas volume in fluid communication with the second end of the hollow cylinder; and
e) a flexible diaphragm separating the compressible gas volume of the cylinder cover from the second end of the hollow cylinder; the diaphragm being biased toward the first end of the hollow cylinder and defining a fluid volume in the hollow cylinder between the diaphragm and the end of the piston.

7. The cushion of claim 6, wherein the cylinder cover further comprises an adjustment valve passing through the cylinder cover between an outside of the cylinder cover and the compressible gas volume.

8. The cushion of claim 6, further comprising a diaphragm return spring between the diaphragm and the cylinder cover, applying a bias force against the flexible diaphragm toward the first end of the hollow cylinder.

9. The cushion of claim 6, wherein the cylinder housing further comprises a bleeder valve providing a closable path from the second end of the hollow cylinder to an outside of the cylinder housing.

* * * * *